(12) United States Patent
Yang et al.

(10) Patent No.: US 8,855,421 B2
(45) Date of Patent: Oct. 7, 2014

(54) METHODS AND APPARATUSES FOR EMBEDDED MEDIA MARKER IDENTIFICATION

(75) Inventors: Xin Yang, Santa Barbara, CA (US); Qiong Liu, Milpitas, CA (US); Chunyuan Liao, San Jose, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 678 days.

(21) Appl. No.: 13/093,661

(22) Filed: Apr. 25, 2011

(65) Prior Publication Data
US 2012/0269439 A1 Oct. 25, 2012

(51) Int. Cl.
*G06K 9/00* (2006.01)
*G06K 9/68* (2006.01)

(52) U.S. Cl.
CPC .......... *G06K 9/00671* (2013.01); *G06K 9/6857* (2013.01)
USPC ........... 382/181; 382/190; 382/192; 382/195; 382/216; 382/306; 707/723

(58) Field of Classification Search
USPC ......... 382/181, 183, 184, 190, 192, 195, 209, 382/216–218, 305, 306; 707/705, 722, 723, 707/752, 753, 758, 769, 778; 715/205, 207, 715/208; 235/435, 454, 457, 462.01, 235/462.08, 462.09, 462.1, 462.24, 462.41, 235/470, 487, 494
See application file for complete search history.

(56) References Cited

U.S. PATENT DOCUMENTS 5,754,692 A * 5/1998 Kondo et al. ................. 382/216
5,802,361 A * 9/1998 Wang et al. ................... 382/217
8,073,818 B2 * 12/2011 Duan et al. .................... 707/687
8,254,697 B2 * 8/2012 Isard et al. .................... 382/209
8,285,655 B1 * 10/2012 Medasani et al. .............. 706/14
2011/0238659 A1 * 9/2011 Chittar et al. ................. 707/724

OTHER PUBLICATIONS

Qiong Liu, Chunyuan Liao, Lynn Wilcox, Anthony Dunnigan and Bee Liew, "Embedded Media Markers: Marks on Paper that Signify Associated Media", Proceedings of ACM, Apr. 4-9, 2009, pp. 1-10.*
Yang Cao, Changhu Wang, Zhiwei Li, Liqing Zhang and Lei Zhang, "Spatial-Bag-of-Features", IEEE, Conference on Computer Vision and Pattern Recognition, Jun. 2010, pp. 3352-3359.*
Zhong Wu et al., "Bundling Features for Large Scale Partial-Duplicate Web Image Search", Proceedings of CVPR'09, Jun. 2009, 8 pages.
Svetlana Lazebnik et al., "Beyond Bags of Features: Spatial Pyramid Matching for Recognizing Natural Scene Categories", Proceedings of CVPR'06, Oct. 9, 2006, 8 pages.
Ondřej Chum et al., "Geometric min-Hashing: Finding a (Thick) Needle in a Haystack", Proceedings of CVPR'09, May 5, 2009, pp. 1-8.

(Continued)

*Primary Examiner* — Eric Rush
(74) *Attorney, Agent, or Firm* — Sughrue Mion, PLLC

(57) ABSTRACT

Methods and apparatuses for identifying an image based on Embedded Media Marker (EMM) identification. A hierarchal comparison including a first coarse comparison and a second refining comparison is used. The first coarse comparison compares an image with an EMM to images in a database at a low resolution. The results are fed to the second refining comparison, which conducts a comparison at a higher resolution than the first coarse comparison. By utilizing this hierarchical comparison approach, it is possible to identify the image with fewer false positives.

20 Claims, 9 Drawing Sheets

(56) References Cited

OTHER PUBLICATIONS

Herve Jegou et al., "Hamming Embedding and Weak Geometric Consistency for Large Scale Image Search", Proceedings of ECCV'08, Oct. 2008, pp. 1-15.

David G. Lowe, "Distinctive Image Features From Scale-Invariant Keypoints", Jan. 5, 2004, pp. 1-28, IJCV.

James Philbin et al., "Object Retrieval with Large Vocabularies and Fast Spatial Matching", Proceedings of CVPR'07, Jul. 16, 2007, 8 pages.

Qiong Liu et al., "Embedded Media Marker: Linking Multimedia to Paper", Proceedings of ACM Multimedia'10, Oct. 2010, 2 pages.

Qiong Liu et al., "Embedded Media Markers: Marks on Paper that Signify Associated Media", Proceedings of ACM, Apr. 4-9, 2009, pp. 1-10.

Josef Sivic, et al., "Video Google: A Text Retrieval Approach to Object Matching in Videos", Proceedings of the International Conference on Computer Vision, IEEE Computer Society, 2003, pp. 1-8, vol. 2.

Barcode. *Wikipedia.*, last modified Apr. 2, 2011 at 20:36, Wikimedia Foundation, Inc., accessed Apr. 14, 2011, <http://en.wikipedia.org/wiki/Barcode>.

Berna Erol, et al., "Hotpaper: Multimedia Interaction with Paper using Mobile Phones", Proceedings of Multimedia'08, Oct. 27-Nov. 1, 2008, pp. 399-408, Vancouver, Canada.

SnapTell—Visual Product Search. 2007-2009, Snaptell, Inc., accessed Apr. 14, 2011, http://www.snaptell.com/.

Kooaba: Make Smart Visuals—image recognition products for mobile and desktop, accessed Apr. 14, 2011, http://www.kooaba.com/.

Kristen Lorraine Grauman, "Matching Sets of Features for Efficient Retrieval and Recognition", Aug. 11, 2006, pp. 1-153, Massachusetts Institute of Technology, Cambridge, USA.

David Nistér et al., "Scalable Recognition with a Vocabulary Tree", Proceeding of the CVPR06, Oct. 9, 2006, 8 pages.

Michael Donoser et al., "Efficient Maximally Stable Extremal Region (MSER) Tracking", Proceeding of CVPR06, Jul. 5, 2006, 8 pages.

Jonathon S. Hare et al., "MapSnapper: Engineering an Efficient Algorithm for Matching Images of Maps from Mobile Phones", Proceedings of Multimedia Content Access: Algorithms and Systems II, Jan. 28, 2008, 11 pages.

Wengang Zhou et al., "Spatial Coding for Large Scale Partial-Duplicate Web Image Search", Proceedings of ACM Multimedial'10, Oct. 25-29, 2010, pp. 511-520, Firenze, Italy.

* cited by examiner

| Word ID | Image ID | Grid ID |
|---------|----------|---------|
| A | DUK | 0 |
| B | DUK | 2 |
| C | DUK | 2 |
| D | DUK | 1 |
| E | DUK | 2 |
| F | DUK | 3 |
| G | DUK | 3 |

FIG. 5

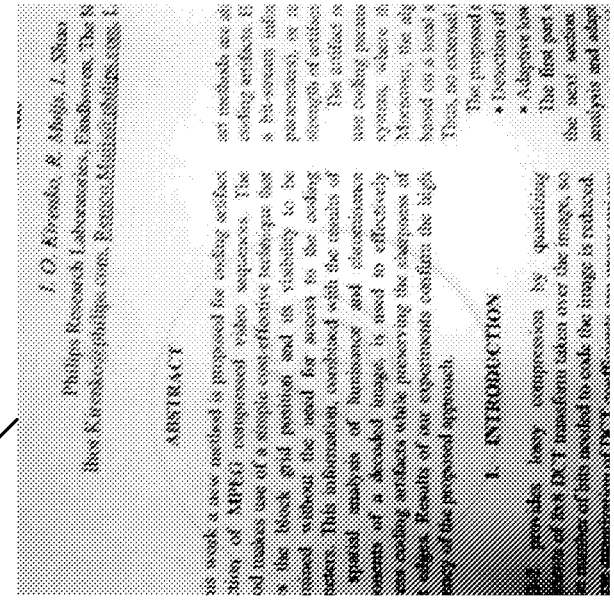

Ihor.Kirenko@philips.com, Remco.M

ABSTRACT

In this work a new method is proposed for coding artifact reduction of MPEG compressed video sequences. The method makes use of a simple cost-effective technique that allows the block grid position and its visibility to be determined without the need for access to the coding parameters. This information, combined with the results of local spatial analysis of luminance and chrominance components of a decoded image, is used to effectively suppress coding artifacts while preserving the sharpness of object edges. Results of our experiments confirm the high efficiency of the proposed approach.

1. INTRODUCTION

MPEG-2 provides lossy compression by quantizing coefficients of 8x8 DCT transform taken over the image, so

FIG. 7

METHODS AND APPARATUSES FOR EMBEDDED MEDIA MARKER IDENTIFICATION

BACKGROUND

1. Field of the Invention

This invention generally relates to methods and apparatuses for image identification, and more specifically to methods and apparatuses for identifying images containing an Embedded Media Marker (EMM).

2. Description of the Related Art

The techniques of linking dynamic media with a static paper document through devices such as camera phones can be applied to many interesting applications, such as multimedia enhanced books and multimedia advertisement on paper. For example, two dimensional barcodes can be utilized on such static paper documents and can therefore be easily recognized by modern camera phones. However, barcodes tend to be visually obtrusive and interfere with the document layout when being associated with specific document content.

Other systems rely on the document content for identification. For example, visual features within the document can be utilized to identify the document. Linking media to text on the static paper document by utilizing features based on the word bounding boxes of the document (boxes that surround one or more words of a static paper document) is also possible. However, these methods fail to achieve good accuracy and scalability without providing guidance as to which of the content within the static paper document can potentially link to media information. Specifically, if such guidance is not provided adequately to users, an aimlessly captured query image that is submitted for identification may contain various distortions that lead to low identification accuracy. Similarly, without such proper indications, previous systems have needed to characterize and index entire document pages for proper identification; thereby incurring high time and memory costs for large datasets.

To address these problems, index indicators such as Embedded Media Markers (EMM) have been utilized for identification purposes. EMMs are nearly transparent markers printed on paper documents at certain locations which are linked with additional media information. Analogous to hyperlinks, EMMs indicate the existence of links. An EMM-signified patch overlaid on the document can be captured by the user with a camera phone in order to view associated digital media. Once the EMM signified patch is captured by the camera phone, the captured image can be compared to a database of EMM or index indicators for identification, which can be utilized to retrieve the appropriate digital media.

FIG. 1 displays a sequence of a conventional process using an EMM, with an example document 100 with an EMM overlaid at the top right corner 101. The user takes a close-up of an EMM-signified patch 102 on the example document. By using the EMMs, only the EMM-signified patches need to be characterized and indexed. This can greatly reduce feature extraction time and memory usage and further enhance accuracy by excluding noisy features of contents outside the EMM.

Subsequently, at the identifying stage, the EMMs can guide users to capture an EMM-signified region, yielding a query image with much fewer distortions 103. After a sufficient query image is obtained, the next task of EMM identification is then to recognize the camera-phone-captured query image as an original EMM-signified patch indexed in the dataset so that to retrieve and play relevant media on cell phones 104.

EMMs can be represented as meaningful-awareness markers overlaid on the original paper document to guide image capture and limit processing cost. However, current EMM identification systems still rely strictly on general local-feature-based matching approaches, such as strict comparison of geographical features, without considering any particular matching constraints. Such strict comparison of geographical features suffers from low accuracy and high memory/time complexity in practice.

Therefore, there is a need for an identification scheme which provides for high accuracy with low memory and time complexity.

SUMMARY

Aspects of the present invention include a method of image identification, which may involve receiving an image containing an Embedded Media Marker (EMM); conducting a first comparison of the image with database images, the conducting the first comparison comprising representing the received image as a first grid; ranking the database images based on the comparison; conducting a second comparison of the image with images selected based on the ranking the database images, the conducting the second comparison representing the received image as a second grid; ranking the selected images based on the comparison; and returning at least one of the ranked selected images based on the ranking of the selected images. The second grid may have a higher resolution than the first grid.

Aspects of the present invention further include an apparatus that may include a camera receiving an image containing an Embedded Media Marker (EMM); a first comparison unit conducting a first comparison of the image with database images, ranking the database images based on the comparison, and retrieving images from the database based on the ranking, the first comparison unit representing the received image as a first grid; and a second comparison unit conducting a second comparison of the image with each of the retrieved images, ranking the selected images based on the comparison; and returning at least one of the ranked selected image based on the ranking, the second comparison unit representing the received image as a second grid. The second grid may have a higher resolution than the first grid.

Aspects of the present invention further include a non-transitory computer readable medium storing instructions for executing a method for image identification. The method stored in the computer readable medium may include receiving an image containing an Embedded Media Marker (EMM); conducting a first comparison of the image with database images, the conducting the first comparison comprising representing the received image as a first grid; ranking the database images based on the comparison; conducting a second comparison of the image with images selected based on the ranking the database images, the conducting the second comparison representing the received image as a second grid; ranking the selected images based on the comparison; and returning at least one of the ranked selected images based on the ranking of the selected images. The second grid may have a higher resolution than the first grid.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5 illustrates an index file and representation of an image according to an embodiment of the invention.

FIG. 7 illustrates a translation of a received image based on the dominant orientation of the Embedded Media Marker (EMM) according to an embodiments of the invention.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Previous approaches fail to consider matching constraints unique to EMM identification. Therefore, such previous approaches have unnecessarily cost more memory and time in order to achieve satisfactory accuracy for EMM identification. To increase both the efficiency and accuracy of EMM identification, exemplary embodiments of the present invention utilize two matching constraints in a hierarchical manner. Of particular interest are the "injection" and "approximate global geometric consistency" (AGGC for short), which are unique for the EMM identification and are further explained below.

The Injection Constraint

Figure 1:
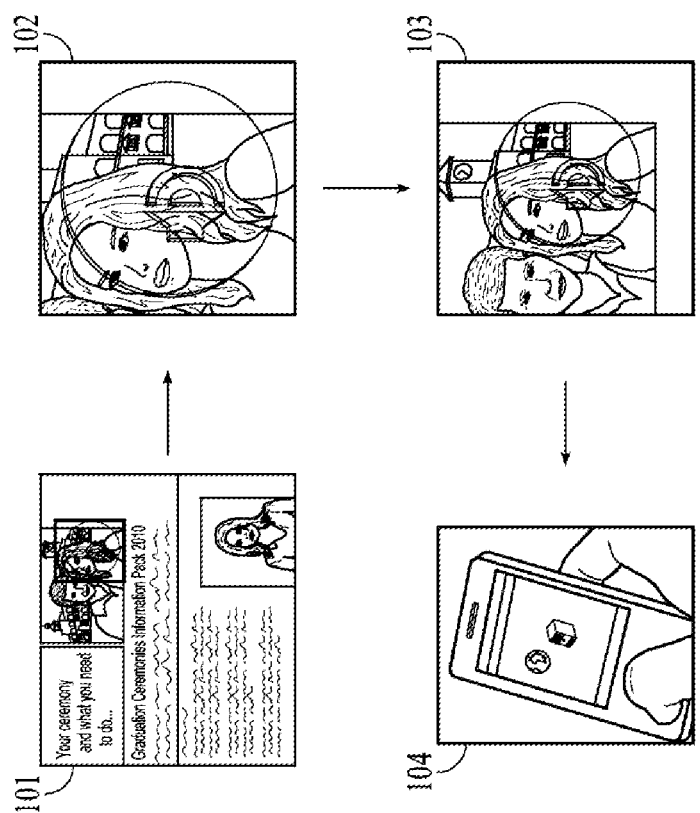
FIG. 1 illustrates a conventional Embedded Media Marker (EMM) identification process.
Figure 2A:
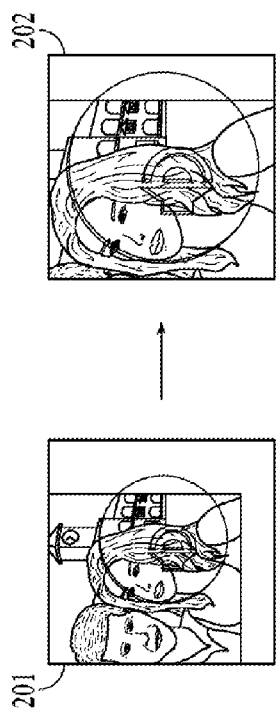
FIGS. 2(a) to 2(c) illustrate image identification based on features of an image according to an embodiment of the invention.
Figure 2B:
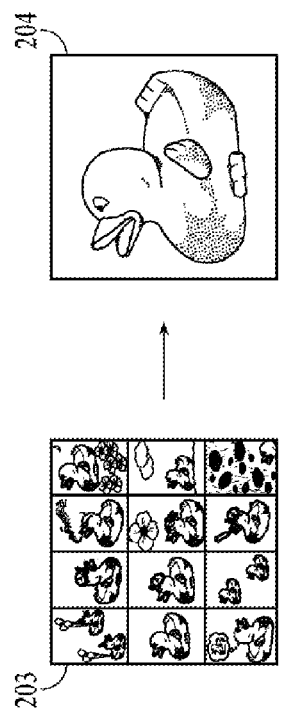

The injection constraint is enforced by the way of generating query images in EMM identification, where the query image is a camera-captured version 201 of an original EMM-signified patch 202, as shown in FIG. 2(a). This property implies that each detected "salient" region of a query image can be mapped to by at most one common region of the target image, i.e. "injective mapping". However, such a constraint may not hold in near-/partial-duplicate image detection, where a query image is generated by extensive digital editing of an original image 204. FIG. 2(b) illustrates an exemplary case that violates this constraint, which needs to be targeted by partial-duplicate detection 204. In order for the appropriate original image 204 to be adequately retrieved, partial sections of the query image 203 therefore may need to be analyzed against images in the database in order to ensure that the appropriate image is obtained.

The AGGC Constraint

Figure 2C:
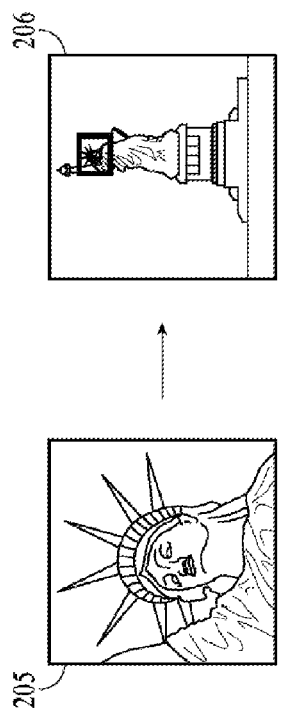

The AGGC constraint is enforced by EMMs, which confines the geometric changes between a query image and its target within a small predictable range, so that the spatial layout of a query image should be globally consistent with that of its target image with high fidelity. Such constraint does not always hold in other similar applications. FIG. 2(c) illustrates an example of two images 205 and 206 containing the same object of very different scale. Matching them is required for object recognition applications, but it is not expected for EMM identification to match them. Limiting the scope of the search by taking into account the injection and AGGC constraints can help further increase accuracy and reduce memory and time complexity. In this example, by taking into account the scaling issues between the two images 205 and 206, the appropriate image can thereby be obtained should one of the images be used as a query.

To fully utilize these matching constraints while achieving high identification accuracy and addressing the issues with each individual constraint, two constraining functions are designed based on multi-resolution gridding information to detect "injective" and "AGGC" correspondences and use them to detect image similarity accurately. A spatial neighborhood search approach is further proposed to address challenging cases with a large translational shift. To achieve scalability, a hierarchical strategy is utilized to compact the memory and limit the processing time.

Workflow of Exemplary Matching Scheme

Figure 3:
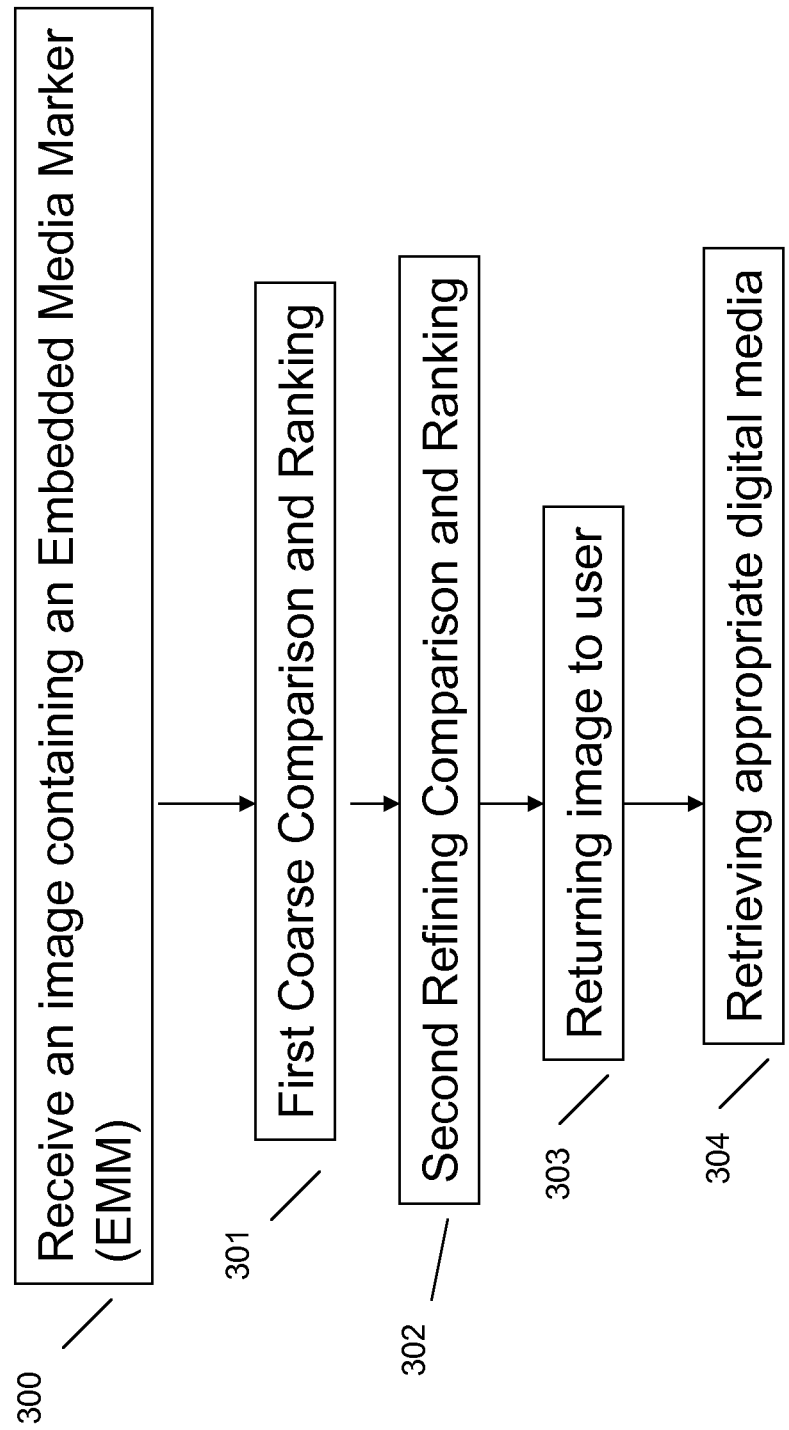
FIG. 3 is a flowchart illustrating a method according to an embodiment of the invention.

FIG. 3 illustrates the workflow of an exemplary matching scheme that incorporates the AGGC and injection matching constraints in accordance to a hierarchical strategy according to exemplary embodiments of the invention. This approach can be called a "Geometric Constrained Correspondences Voting" (GCCV for short). Upon receiving an image containing an EMM 300, the strategy utilizes the AGGC and injection matching constraints with the following hierarchy:

(1) Conducting a first coarse comparison and ranking 301. During this stage, exemplary embodiments of the invention utilize the AGGC constraint to conduct a coarse level ranking of images in a database. Initial "AGGC" correspondences construction works by placing coarse-level grids over each image and only matching visual words residing in the same coarse-level grids to one another. All the indexed images are then ranked based on the aforementioned "AGGC" correspondences.

(2) Conducting a second refining comparison and ranking 302 based on the ranking from the first coarse comparison. During this stage, exemplary embodiments of the invention utilize correspondence refinement which works by partitioning the top-ranked images into finer resolution grids, and verifying their initial correspondences using the "injection" constraint at fine granularity. To further reduce errors caused by large translational shifts, a "translation compensation"

algorithm can also be optionally utilized. The translation compensation algorithm estimates the translation changes and roughly aligns images before finding the qualified correspondences. This is conducted by determining the dominant orientation of the image containing the EMM based on the present orientation of the EMM, and creating a grid or other representation according to the dominant orientation.

(3) Returning a top image or images to the user 303. Finally, the qualified correspondences are used for ranking database images and a top image or images may be returned to users for a final confirmation. Alternatively, the process may forgo the final confirmation altogether and utilize the top indexed image for digital media retrieval.

(4) Retrieve appropriate digital media 304 based on the previous step 303.

In addition, a hierarchical encoding/decoding strategy is incorporated for efficiently storing and utilizing the multi-resolution grid information. The grid can be represented in the form of tables, as further described in the technical description of the comparisons below.

Description of the First Coarse Comparison Ranking Based on the AGGC Matching Constraint The "AGGC" constraint implies that the spatial layout of a query image should be globally consistent with that of its target image with high fidelity. Therefore, the corresponding features should be located at similar locations between the two respective images. Based on this assumption, a matching scheme such as Grid-Bag-of-Words (G-BOW) matching can be used for finding initial correspondents which satisfy the "AGGC" constraint. G-BOW matching works by partitioning an image into n equal-sized grids and then matching a local feature $f_q$ of a query image to a local feature $f_{idx}$ of an indexed image if $f_q$ and $f_{idx}$ are quantized into the same visual word by the quantizer q(.) and have the same grid-id; that is, $$F_{G-BOW}(f_q, f_{idx}) = \begin{cases} 1 & \text{if } q(f_q) = q(f_{idx}) \text{ \&} \\ & \text{grid-}id(f_q) = \text{grid-}id(f_{idx}) \\ 0 & \text{otherwise} \end{cases} \quad (1)$$

Summing up the normalized G-BoW matching value of query features within grid i, the matching score of the grid i is thereby obtained:

$$sim(I_{qi}, I_{idxi}) = \frac{\sum_{f_q \in I_{qi}} F_{G-BOW}(f_q, f_{idx})}{|I_{qi}| \times |I_{idxi}|} \quad (2)$$

where $|I_{qi}|$ and $|I_{idxi}|$ are the total number of visual words within grid i of a query image and an indexed image, respectively. The matching score of all the separate grids can be summed up, which yields the final image similarity between query image $I_q$ and index image $I_{idx}$, $$sim(I_q, I_{idx}) = \sum_{i=0}^{n} sim(I_{qi}, I_{idxi}) \quad (3)$$

Figure 4:
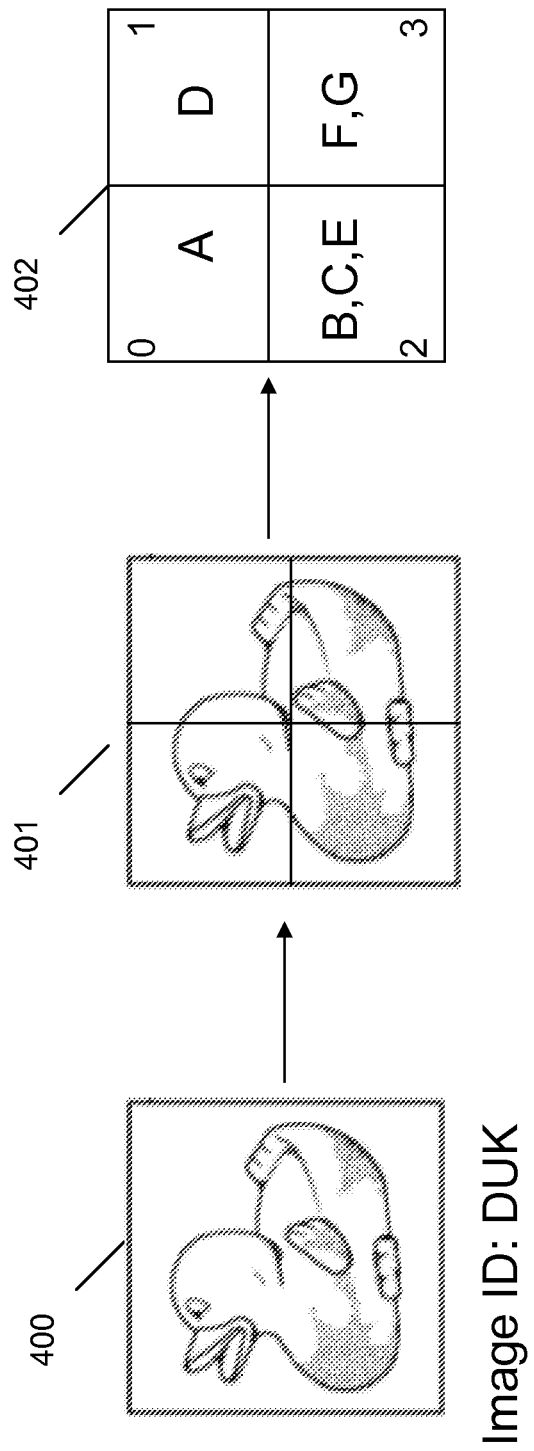
FIG. 4 illustrates a gridding process according to an embodiment of the invention.

FIG. 4 illustrates an exemplary implementation of the G-BOW method with a 2×2 grid. The image 400 is represented in a 2×2 grid 401, from which correspondences can be extracted from each grid and a homography matrix can be constructed 402. The homography matrix represents the correspondences of each grid as a bit string or a word id for easier comparison.

By utilizing the proposed G-BOW method with appropriate grids (e.g. 2×2, 4×4, etc.), the method ensures that most of the matches satisfies the "AGGC" constraint, whereas a naïve application of the algorithm without gridding would violate the AGGC constraint. Additionally, if the homography is estimated correctly by the aforementioned translation compensation algorithm or by other means, correspondences can be further verified for homography consistency, which will produce significantly less false positives than a naive application without gridding.

Memory Complexity. In practice, to implement G-BoW matching efficiently, the grid id of indexed local features and record them in a table for an indexing file. This solution only costs slightly more memory space for an indexing file than the image file without gridding. For example, to record a grid id of 4×4 grids, only an extra 4 bits are needed for each local feature.

FIG. 5 is an example of a possible indexing file representing the image of FIG. 4. The index file may be sorted by word id, which is a representation of a local feature in the image, the grid id corresponding to the local feature representation for indexing, and an appropriate file name.

Time Complexity. Extra time cost for the matching includes: 1) online grid id computing for features of a query image; and 2) fetching the grid id of indexed features from memory and comparing them with that of query image. Normally, such matching would thereby be expected to increase the time cost. However, involving grid matching does not actually increase the time cost. Instead, it slightly decreases the time due to eliminating the need for matching many unqualified features and updating the matching scores.

Description of the Second Refining Ranking Based on the Injection Matching Constraint The first coarse comparison and ranking provides initial correspondences satisfying the "AGGC" constraint. However, such a scheme can not guarantee the "injective mapping" condition when M features, which are quantized into the same grid, match to N (M≠N) features quantized into a common grid. Therefore, by increasing the resolution (i.e. increasing the number of grids, or enforcing a stricter spatial constraint), unqualified correspondences may thereby be excluded. However, this may also decrease the robustness to geometric changes, resulting in absences of qualified correspondences. To solve this problem, homography verification (for example, determining the dominant orientation of the image and conducting the comparison accordingly) can be employed to preserve the "injection" property when the perspective changes between two images are small (such conditions can be satisfied in EMM identification). In an exemplary procedure, a hypothesized homography is first estimated based on candidate correspondences at pixel level, and each correspondence is then verified by checking the homography consistency. Finally, the matching score is updated according to the number of the homography consistent correspondences.

However, the traditional homography estimation and verification is not ideal due to the following reasons: 1) loading the pixel-level coordinates from hard disk takes too much time; 2) homography estimation and verification using pixel-level spatial information is sensitive to small keypoint location changes; 3) tentative matches obtained from BoW matching are very noisy, which may significantly increase the time for computing a matrix and also decrease the accuracy of the estimated matrix.

Addressing these limitations, a more efficient verification procedure at grid level, such as Approximate Geometric Verification (AGV), can be utilized. Fine-level grid information of the initial correspondences is used for estimating the homography matrix. Subsequently, all the tentative matches are verified based on the homography consistency.

Figure 6:
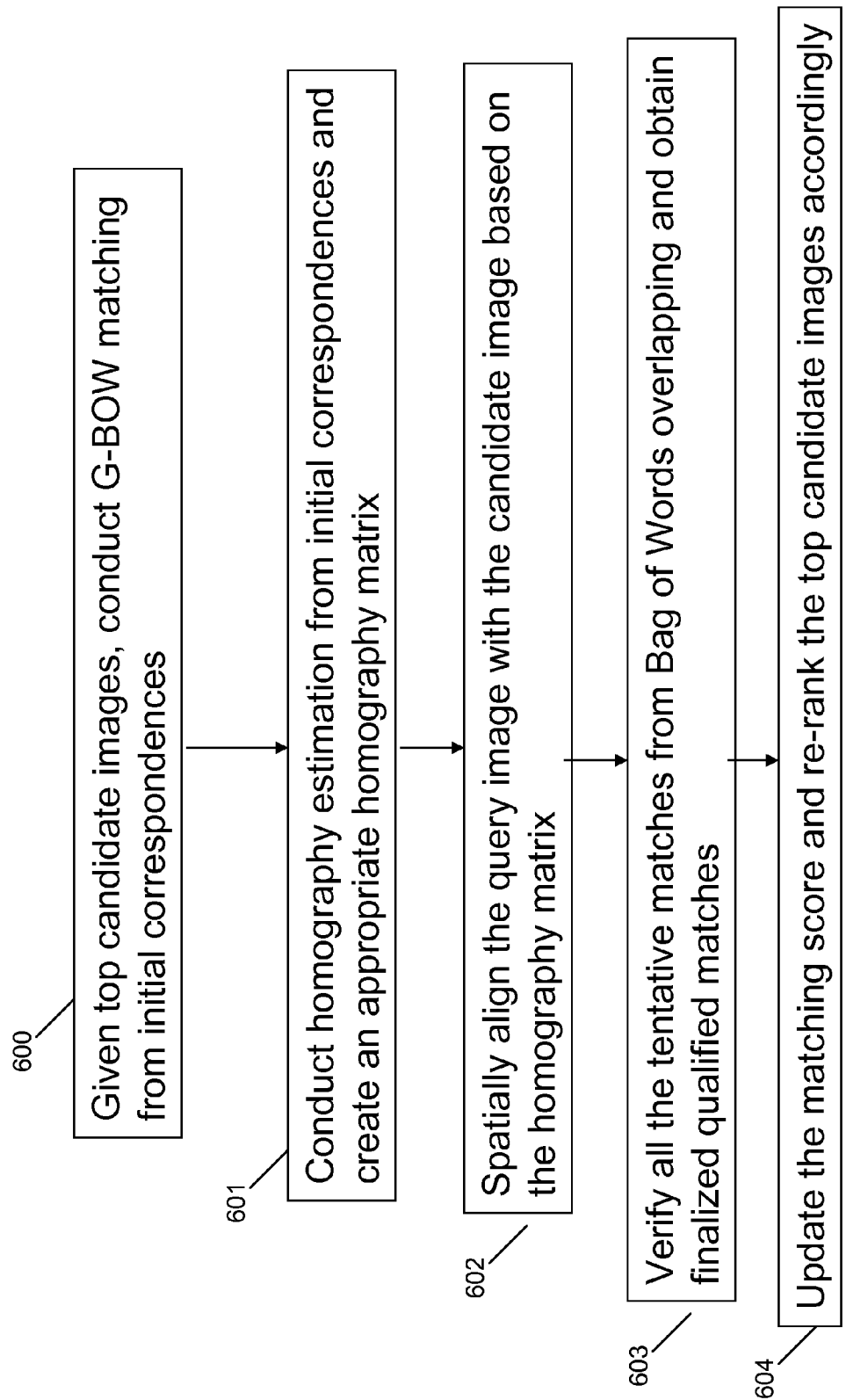
FIG. 6 illustrates a flowchart of a comparison method according to an embodiment of the invention.

FIG. 6 illustrates an exemplary process for approximate geometric verification. Given top candidate images, G-BOW matching is first conducted from the initial correspondences 600. Homography estimation is then conducted from the initial correspondences and an appropriate homography matrix may be created 601. The query image may be spatially aligned with the candidate image based on the homography matrix 602. Tentative matches are then verified from bag of words overlapping, and finalized qualified matches may thereby be obtained 603. The matching score can thereby be updated (for example, according to formulas (2) and (3)), and the top candidate images are re-ranked accordingly 604.

Hard quantization for finding the "AGGC" correspondences may cause the loss of some qualified matches, therefore, all the tentative matches are verified to partially make up the loss. When selecting the number of grids for AGV, there is a tradeoff between distinguishing ability and space complexity: the more grids that are used, the more precise the coordinates of correspondences become, but more bits are thereby needed to store the gridding information. Several parameters: 16×16, 32×32 and 64×64 can be utilized, with 32×32 tending to produce the best results.

AGV vs. Traditional Geometric Verification. Approximate geometric verification outperforms the traditional geometric verification from speed perspective due to two reasons. First, quantized location information is compact enough (e.g. a 32×32 grid id only takes 10 bits per feature) to be stored in memory, which helps eliminating the time for accessing hard disks during refinement step. Second, correspondences obtained by G-BoW matching are much less noisy than those from BoW matching, thus using them can greatly reduce the estimation time. Experiments also show that, using correspondences from G-BoW matching achieves much higher identification accuracy than using those from BoW.

Translation Compensation

For challenging cases with large geometric changes, a hard quantization may inevitably discard many qualified "AGGC" correspondences and consequently degenerate the homography estimation accuracy or even completely miss the target image if the target image fails to be placed in the top-ranked candidate list. For example, a translational shift that is larger than image_size/$n^{1/2}$ (n is the number of grids in the "AGGC" correspondence construction step) will make all the grids completely misaligned so that none "AGGC" correspondences can be detected for the target image. Therefore, compensating for the errors caused by misalignment is crucial for achieving good identification accuracy.

A straightforward solution to solve the translation problem is by using soft spatial assignment. In other words, instead of comparing the point of the image with the EMM with the corresponding point in the database image, one solution is to assign a point to the eight neighboring grids beyond the grid where the point falls in. However, such a simple strategy may introduce too much noise and consequently decrease the accuracy and increase the time cost. In most cases, out of nine quantized directions, there is only one direction which can best approximate the real translation changes. Thus, most points assigned to the wrong directions simply become noise.

To overcome the limitation of soft assignment and reducing the translation-caused errors, the better solution is to determine the dominant orientation of the EMM before conducting the comparison. Once the dominant orientation is determined, the best translation direction can be estimated between the two images and then all the points can be assigned to this direction, and therefore the correct adjacent point or translated point can be determined. To implement this idea, it can be assumed that: the majority of grids should obtain the maximum similarity (as shown in equation (2)) when shifting towards the best translation direction. In other words, the direction which has the most maximum matching scores over all the grids is the best translation direction. The following algorithm describes an exemplary procedure for estimating translation direction.

```
for {each indexed image}
    for {each grid i=1:16}
        for {each neighbors j=1:9}
            compute a matching score S[j]
        end
        maxScoreCount[i] += find_max(S[j])
    end
    direction = find_max(maxScoreCount[i])
end
```

After obtaining the best translation direction, each point is then assigned to this direction for finding the "AGGC" correspondences. Therefore, a set $M_{best}$ can be obtained, which contains correspondences between words of the current grid and words of the best neighboring grid. To compensate the errors caused by translation changes, the matching score is computed and the homography is estimated using the set $M_{best}$.

FIG. 7 provides an example of homography estimation based on the dominant orientation of the received image. From the received image 700, the translation is conducted based determining the dominant orientation of the EMM (i.e. determining the correct shape, size, orientation, up-scale, down-scale, etc.), and a translation is estimated accordingly 701. The estimation can take the form of an image or can be a simple matrix or a grid representing the features of the image, or in the same format as the index file.

Hierarchical Encoding/Decoding

An efficient strategy for storing and decoding the multi-resolution spatial information should meet the following three requirements: 1) it should take as little memory space as possible; 2) it should fast compute the desired information, including coarse-level grid id, neighboring grid id and fine-level coordinates; 3) it should be easy to adjust the parameters, such as the number of coarse-level grids. Therefore, embodiments of the invention can optionally utilize a hierarchical encoding and decoding strategy which best satisfies these requirements. Each image is hierarchically quantized into $2^k \times 2^k$ grids: an image is firstly partitioned into 2×2 grids and then each grid is iteratively subdivided into 2×2 grids, yielding $2^k \times 2^k$ grids at level k. FIG. 4 illustrates an example when k=1. Then each grid at level k is given a unique grid ID (such as sequential numbering or encoded by coordinates ($x_i$, $y_i$), ($1 \le i \le k$), uniquely denoting one of the 4 positions in the upper level grid ($x_{i-1}$, $y_{i-1}$)). Finally the coordinates at all levels are concatenated together to form a bit string, and can be indexed accordingly as shown in FIG. 5.

Memory Complexity: Given the number of finest-level grids, the proposed scheme takes the least memory space by embedding all the coarser-level information into the corresponding finest-level grid id. In addition, such information can be bundled with the image id of each local feature and stored in the inverted file for fast accessing. FIG. 5 shows an exemplary structure of the index. Each visual word has an entry in the index that contains the list of images in which the visual word appears and the corresponding grid ID.

Time Complexity: A hierarchal strategy can parse all the desired information using a few bit/add/subtract operations, which is very fast in practical use.

Figure 8:
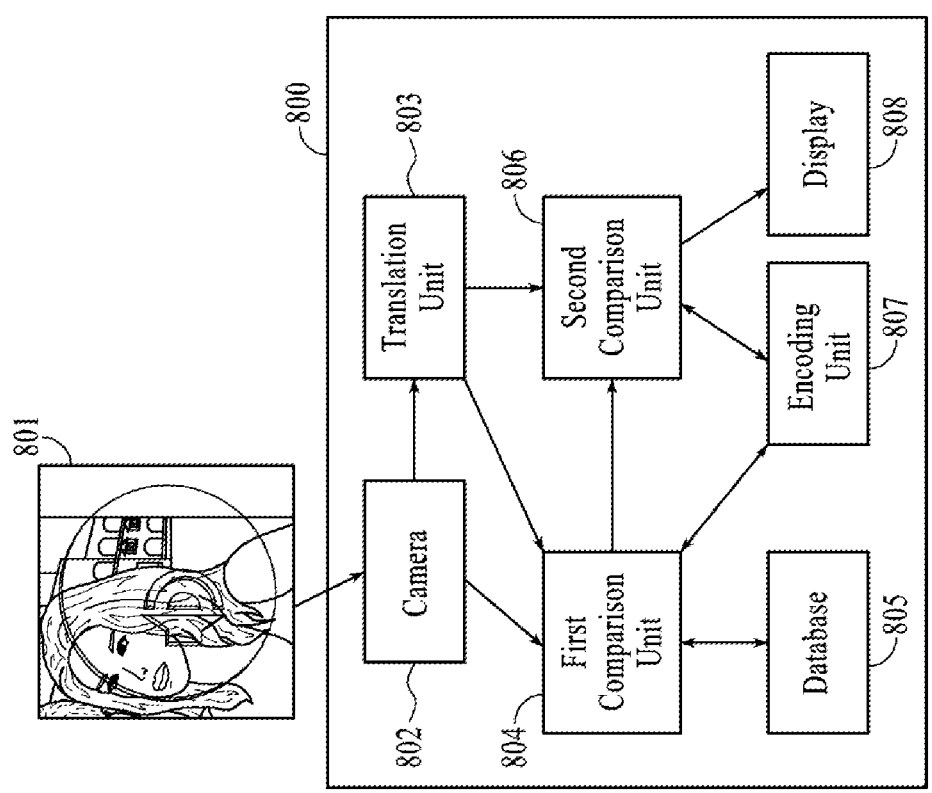
FIG. 8 illustrates a functional diagram of an apparatus according to an embodiment of the invention.

FIG. 8 illustrates an example functional diagram of an apparatus 800 according to an exemplary embodiment of the invention. An image containing an EMM 801 is received by a camera 802, which forwards the image to the first comparison unit 804 to conduct the first comparison with a database 805. The apparatus may optionally forward the image to a translation unit 803 for translating the image and an encoding unit to encode the image as needed. The results of the first comparison unit is forwarded to a second comparison unit 806. Results from the second comparison unit may be forwarded to the display 808, or appropriate digital media may be loaded and displayed. An encoding unit 807 may also be used to represent the received image in the format of an index file or files used to represent the images in the database.

Figure 9:
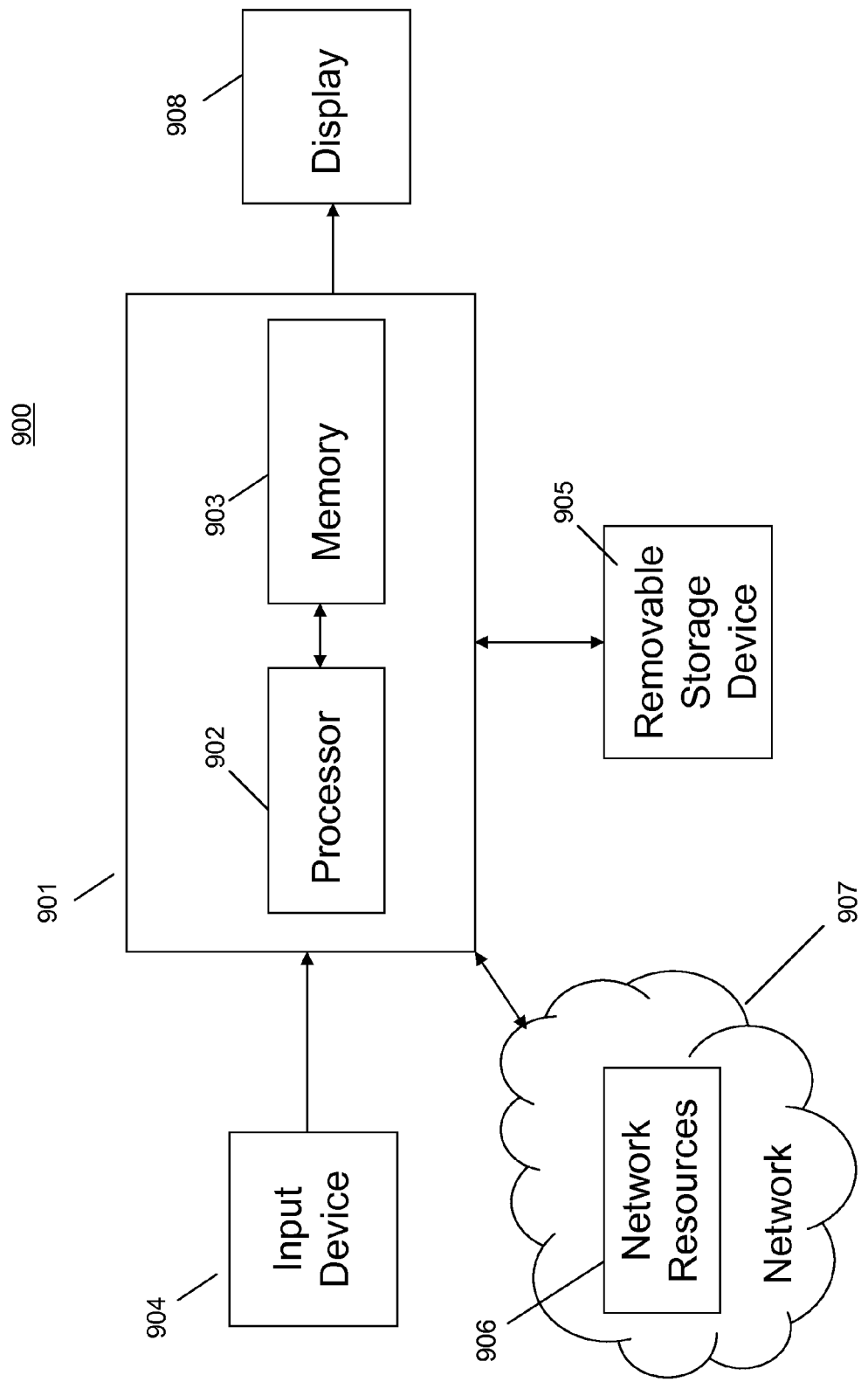
FIG. 9 illustrates an embodiment of a computer platform upon which the inventive system may be implemented.

FIG. 9 is a block diagram that illustrates an embodiment of a computer/server system 900 upon which an embodiment of the inventive methodology may be implemented. The system 900 includes a computer/server platform 901 including a processor 902 and memory 903 which operate to execute instructions, as known to one of skill in the art. The term "computer-readable medium" as used herein refers to any medium that participates in providing instructions to processor 902 for execution. Additionally, the computer platform 901 receives input from a plurality of input devices 904, such as a keyboard, mouse, touch device or verbal command. The computer platform 901 may additionally be connected to a removable storage device 905, such as a portable hard drive, optical media (CD or DVD), disk media or any other medium from which a computer can read executable code. The computer platform may further be connected to network resources 906 which connect to the Internet or other components of a local public or private network. The network resources 906 may provide instructions and data to the computer platform from a remote location on a network 907. The connections to the network resources 906 may be via wireless protocols, such as the 802.11 standards, Bluetooth® or cellular protocols, or via physical transmission media, such as cables or fiber optics. The network resources may include storage devices for storing data and executable instructions at a location separate from the computer platform 901. The computer interacts with a display 908 to output data and other information to a user, as well as to request additional instructions and input from the user. The display 908 may therefore further act as an input device 904 for interacting with a user.

Moreover, other implementations of the invention will be apparent to those skilled in the art from consideration of the specification and practice of the invention disclosed herein. Various aspects and/or components of the described embodiments may be used singly or in any combination in the image identification system. It is intended that the specification and examples be considered as exemplary only, with a true scope and spirit of the invention being indicated by the following claims.

What is claimed is:

1. A method of identifying an indexed image, the method comprising:
   receiving a first image containing an index indicator;
   conducting a first comparison of the first image with candidate indexed images, the conducting the first comparison comprising constructing a first representation of the first image in which the first image is represented with a grid having a first resolution, representing each of the candidate indexed images with a grid having the first resolution, and identifying the number of matching correspondences between grid locations of the first representation and the corresponding grid locations of each of the candidate indexed images;
   conducting a first ranking of the candidate indexed images based on the number of matching correspondences of the first comparison;
   selecting candidate indexed images based on the first ranking;
   conducting a second comparison of the first image with the selected candidate indexed images, the conducting the second comparison comprising creating a second representation of the first image in which the first image is represented with a grid having a second resolution higher than the first resolution, representing each of the selected candidate indexed images with a grid having the second resolution, and identifying the number of matching correspondences between grid locations of the second representation and the corresponding grid locations of each of the selected candidate indexed images;
   conducting a second ranking of the selected candidate indexed images based on the number of matching correspondences of the second comparison; and
   identifying the indexed image based on the second ranking.

2. The method of claim 1, wherein the conducting the second comparison comprises:
   extracting features of an Embedded Media Marker (EMM) from the index indicator;
   determining a dominant orientation of the first image based on an orientation of the EMM; and
   representing the dominant orientation of the first image containing the EMM with the second representation;
   wherein the second ranking further comprises scoring each of the at least one of the selected candidate indexed images based on the number of matching correspondences of the second comparison.

3. The method of claim 2, wherein the identifying the number of matching correspondences of the second comparison comprises:
   comparing a feature from grid locations of the second representation with a corresponding feature from the corresponding grid locations of each of the selected candidate indexed images;
   wherein the corresponding feature is determined by conducting a translation based on the dominant orientation.

4. The method of claim 1, wherein the identifying the number of matching correspondences of the first comparison comprises:
   identifying a number of matching attributes between grid locations of the first representation and the corresponding grid locations of each of the candidate indexed images.

5. The method of claim 1; wherein the representing each of the candidate indexed images with a grid in the first comparison comprises:
   utilizing an index file for the candidate indexed images, wherein entries in the index file map attributes of each feature in the grid for each of the candidate indexed images.

6. The method of claim 5, wherein the conducting the first comparison further comprises:
   comparing entries in the index file with the first representation.

7. An apparatus comprising:
   a camera receiving a first image containing an index indicator;

a first comparator configured for conducting a first comparison of the first image with candidate indexed images by constructing a first representation of the first image in which the first image is represented with a grid having a first resolution, representing each of the candidate indexed images with a grid having the first resolution, and identifying the number of matching correspondences between grid locations of the first representation and the corresponding grid locations of each of the candidate indexed images, conducting a first ranking comprising ranking the candidate indexed images based on the number of matching correspondences of the first comparison, and selecting candidate indexed images based on the first ranking; and a second comparator configured for conducting a second comparison of the first image with each of the selected candidate indexed images by creating a second representation of the first image in which the first image is represented with a grid having a second resolution higher than the first resolution, representing each of the selected candidate indexed images with a grid having the second resolution, and identifying the number of matching correspondences between grid locations of the second representation and the corresponding grid locations of each of the selected candidate indexed images, conducting a second ranking comprising ranking the selected images based on the number of matching correspondences of the second comparison; and identifying an indexed image corresponding to the first image based on the second ranking.

8. The apparatus of claim 7, wherein the second comparator conducts the second comparison by:
   extracting features of an Embedded Media Marker (EMM) from the index indicator;
   determining a dominant orientation of the first image based on an orientation of the EMM;
   representing the dominant orientation of the first image containing the EMM with the second representation; and
   wherein the second ranking further comprises scoring each of the selected candidate indexed images based on the number of matching correspondences of the second comparison.

9. The apparatus of claim 8, wherein the second comparator identifies the number of matching correspondences by:
   comparing a feature from grid locations of the second representation with a corresponding feature from the corresponding grid locations of each of the selected candidate indexed images;
   wherein the corresponding feature is determined by conducting a translation based on the dominant orientation.

10. The apparatus of claim 7, wherein the first comparator identifies the number of matching correspondences by
   identifying a number of matching attributes between grid locations of the first representation and the corresponding grid locations of each of the candidate indexed images.

11. The apparatus of claim 10; wherein the representing each of the candidate indexed images with a grid comprises:
   utilizing an index file for the candidate indexed images, wherein entries in the index file map attributes of each feature in the grid for each of the candidate indexed images.

12. The apparatus of claim 11, wherein the first comparator conducts the first comparison by
   comparing entries in the index file with the first representation.

13. A non-transitory computer readable medium comprising instructions executing a process for identifying an indexed image, the process comprising:
   receiving a first image containing an index indicator;
   conducting a first comparison of the first image with candidate indexed images, the conducting the first comparison comprising constructing a first representation of the first image in which the first image is represented with a grid having a first resolution, representing each of the candidate indexed images with a grid having the first resolution, and identifying the number of matching correspondences between grid locations of the first representation and the corresponding grid locations of each of the candidate indexed images;
   conducting a first ranking of the candidate indexed images based on the number of matching correspondences of the first comparison;
   selecting candidate indexed images based on the first ranking;
   conducting a second comparison of the first image with the selected candidate indexed images, the conducting the second comparison comprising creating a second representation of the first image in which the first image is represented with a grid having a second resolution higher than the first resolution, representing each of the selected candidate indexed images with a grid having the second resolution, and identifying the number of matching correspondences between grid locations of the second representation and the corresponding grid locations of each of the selected candidate indexed images;
   conducting a second ranking of the selected candidate indexed images based on the number of matching correspondences of the second comparison; and
   identifying the indexed image based on the second ranking.

14. The computer readable medium of claim 13, wherein the conducting the second comparison comprises:
   extracting features of an Embedded Media Marker (EMM) from the index indicator;
   determining a dominant orientation of the first image based on an orientation of the EMM; and
   representing the dominant orientation of the first image containing the EMM with the second representation;
   wherein the second ranking further comprises scoring each of the at least one of the selected candidate indexed images based on the number of matching correspondences of the second comparison.

15. The computer readable medium of claim 14, wherein the identifying the number of matching correspondences further comprises:
   comparing a feature from grid locations of the second representation with a corresponding feature from the corresponding grid locations of each of the selected candidate indexed images;
   wherein the corresponding feature is determined by conducting a translation based on the dominant orientation.

16. The computer readable medium of claim 13, wherein the identifying the number of matching correspondences of the first comparison comprises:
   identifying a number of matching attributes between grid locations of the first representation and the corresponding grid locations of each of the candidate indexed images.

17. The computer readable medium of claim 16; wherein the representing each of the candidate indexed images with a grid in the first comparison comprises:

utilizing an index file for the candidate indexed images, wherein entries in the index file map attributes of each pixel in the grid for each of the candidate indexed images.

18. The computer readable medium of claim 17, wherein the conducting the first comparison further comprises:
comparing entries in the index file with the first representation.

19. The computer readable medium of claim 18, wherein the process further comprises creating an index representation of the first representation for comparison with the entries in the index file.

20. The computer readable medium of claim 16, wherein the representing each of the candidate indexed images with a grid in the first comparison comprises:
utilizing an index file for the candidate indexed images, wherein entries in the index file map attributes of each feature in the grid for each of the candidate indexed images;
representing the second representation in an index representation for comparison with the index file; and
comparing entries in the index file with the index representation.

* * * * *